United States Patent
Duval et al.

(10) Patent No.: US 11,542,400 B2
(45) Date of Patent: Jan. 3, 2023

(54) EMULSION COMPRISING FATTY ACID ESTER/SURFACTANT MIXTURE FOR CLEANING SPILLED PAINT, VARNISH, DYE AND/OR SURFACE COATING

(71) Applicant: PREVOR INTERNATIONAL, Paris (FR)

(72) Inventors: Aurélien Duval, Rueil Malmaison (FR); Karine Padois, Butry sur Oise (FR); Joël Blomet, Valmondois (FR)

(73) Assignee: PREVOR INTERNATIONAL, Paris (FR)

( * ) Notice: Subject to any disclaimer, the term of this patent is extended or adjusted under 35 U.S.C. 154(b) by 585 days.

(21) Appl. No.: 16/494,689

(22) PCT Filed: Mar. 14, 2018

(86) PCT No.: PCT/FR2018/050611
§ 371 (c)(1),
(2) Date: Sep. 16, 2019

(87) PCT Pub. No.: WO2018/167428
PCT Pub. Date: Sep. 20, 2018

(65) Prior Publication Data
US 2020/0010700 A1    Jan. 9, 2020

(30) Foreign Application Priority Data

Mar. 14, 2017 (FR) ...................... 1752081

(51) Int. Cl.
*C11D 1/825* (2006.01)
*C09D 9/04* (2006.01)
*C09D 9/00* (2006.01)

(52) U.S. Cl.
CPC ............. *C09D 9/04* (2013.01); *C09D 9/005* (2013.01)

(58) Field of Classification Search
CPC ......... C11D 1/667; C11D 3/2093; C11D 3/22; C11D 3/48; C11D 7/266; C11D 7/5086; C11D 11/0023; C11D 17/0017
See application file for complete search history.

(56) References Cited

U.S. PATENT DOCUMENTS

| | | | | |
|---|---|---|---|---|
| 4,457,857 A * | 7/1984 | Sepulveda | ........... | C11D 3/2093 510/505 |
| 5,851,971 A * | 12/1998 | Durbut | ................. | C11D 3/0094 510/528 |
| 5,858,954 A * | 1/1999 | Balzer | .................... | C11D 1/662 510/159 |
| 5,958,869 A * | 9/1999 | Noguchi | ................. | C11D 1/10 510/515 |
| 8,617,317 B1 * | 12/2013 | Levitt | ................. | C11D 3/2093 510/505 |
| 2003/0008803 A1 | 1/2003 | Nilsson et al. | | |
| 2005/0089540 A1 * | 4/2005 | Uchiyama | ............. | C11D 3/505 424/59 |
| 2006/0166854 A1 | 7/2006 | Britton | | |
| 2006/0258557 A1 * | 11/2006 | Popplewell | ............ | C11D 3/505 510/499 |
| 2013/0180066 A1 | 7/2013 | Plotz et al. | | |
| 2014/0155454 A1 * | 6/2014 | Gengler | ................. | A01N 43/38 514/417 |
| 2015/0045278 A1 | 2/2015 | Beisser et al. | | |
| 2017/0009189 A1 * | 1/2017 | Rees | ...................... | C11D 1/722 |
| 2017/0079282 A1 * | 3/2017 | Modak | .................... | A01N 37/02 |

FOREIGN PATENT DOCUMENTS

| | | | |
|---|---|---|---|
| CN | 103525162 | A | 1/2014 |
| CN | 103525163 | A | 1/2014 |
| CN | 103540185 | A1 | 1/2014 |
| EP | 0 294 041 | A2 | 12/1988 |
| EP | 1273756 | A1 | 1/2003 |
| WO | 96/27642 | A1 | 9/1996 |
| WO | 2008/128779 | A1 | 10/2008 |
| WO | 2015/084610 | A1 | 6/2015 |
| WO | 2015084610 | * | 6/2015 |
| WO | 2016/090129 | A1 | 6/2016 |

OTHER PUBLICATIONS

International Search Report, dated Jun. 8, 2018, from corresponding international application No. PCT/FR2018/050611.
Database WPI Week 201431 Thomson Scientific, London, GB; AN 2014-F29099 XP002781412,—& CN 103 540 185 A (Hefei All Round Polymer Material Factory) Jan. 29, 2014 (Jan. 29, 2014) abstract.
Database WPI week 201431 Thomson Scientific, London, GB; AN 2014-E92941 XP002781413, & CN 103 525 163 A (Hefei Huanzhao Polymer Materials Plant) Jan. 22, 2014 (Jan. 22, 2014) abstract.
Database WPI Week 201430 Thomson Scientific, London, GB; AN 2014-E92942 XP002781414,—& CN 103 525 162 A (Hefei Huanzhao Polymer Materials Plant) Jan. 22, 2014 (Jan. 22, 2014) abstract.
The Dow Chemical Company, "ECOSURF™ EH Specialty Surfactants," 8 pages.
REA, "Don't cry over spilt paint—here's what to do," Stuff.co.nz, Jan. 25, 2018, 11 pages.
Wikipedia, "Acrylic paint," https://fr.wikipedia.org/wiki/Peinture_acrylique, 7 pages.
Alany et al., "Effects of alcohols and diols on the phase behaviour of quaternary systems," International Journal of Pharmaceutics, vol. 196, 2000, pp. 141-145.

* cited by examiner

*Primary Examiner* — Charles I Boyer
(74) *Attorney, Agent, or Firm* — Nixon & Vanderhye

(57) ABSTRACT

Disclosed is a liquid mixture (preferably an oil-in-water emulsion) for cleaning spilled paint, varnish, dye and/or surface coating, and a cleaning method comprising a step of applying said mixture to a fresh stain left by paint, varnish, surface coating and/or dye.

17 Claims, 4 Drawing Sheets

| Flooring type | Painted flooring (siloxane paint) | Flooring coated with a glycerophthalic lacquer | Painted flooring (Pliolite® paint) | Resin-treated flooring |
|---|---|---|---|---|
| Flooring after bringing into contact with water | No degradation | No degradation | No degradation | No degradation |
| Flooring after bringing into contact with White spirit | No degradation | Flaking lacquer | Presence of a stain | No degradation |
| Flooring after bringing into contact with Solvapaint diluent | Painted flooring degraded | Presence of blisters | Flooring destroyed | Presence of a stain |
| Flooring after bringing into contact with the Onyx paint cleaning substitute | Flaking flooring | Flaking flooring | No degradation | Presence of a stain |
| Flooring after bringing into contact with the Safer spirit cleaner | Flaking flooring | No degradation | No degradation | No degradation |
| Flooring after bringing into contact with Emulsion No. 1 | No degradation | No degradation | No degradation | No degradation |
| Flooring after bringing into contact with Emulsion No. 2 | No degradation | No degradation | No degradation | No degradation |
| Flooring after bringing into contact with Emulsion No. 3 | No degradation | No degradation | No degradation | No degradation |

EMULSION COMPRISING FATTY ACID ESTER/SURFACTANT MIXTURE FOR CLEANING SPILLED PAINT, VARNISH, DYE AND/OR SURFACE COATING

FIELD OF THE INVENTION

The present invention relates to a liquid mixture (preferentially an oil-in-water emulsion) for cleaning paint, varnish, dye and/or wood stain spills, to the use thereof and to the cleaning process comprising a step of applying said mixture to a fresh stain made by paint, varnish, wood stain and/or dye.

In their environment, human beings are increasingly exposed to accidental paint, varnish, dye and/or wood stain spills. In particular, accidental paint, varnish, dye and/or wood stain spills are very frequent in the superstore sector and the sector of painting professionals.

The consequences of these spills are very serious, both in financial terms and in terms of esthetics and for the safety of the working environment of the professionals and of the public.

PRIOR ART

In order to combat accidental paint, varnish, dye and/or wood stain spills, numerous products are used.

The products most frequently used are paint solvents or diluents, such as white spirit or the CR 10 diluent. These paint solvents or diluents make it possible to efficiently clean stains, regardless of the nature of the paint, varnish, dye and/or wood stain spilled. However, these products, mainly consisting of hydrocarbons, are carcinogenic, inflammable, toxic and dangerous to the environment. In order to attempt to overcome these drawbacks, other replacement solvents have been sold. Among the latter, mention may be made of the product known as "Solvapeint" sold by the company Onyx or the product known as "Brush cleaner" sold by the company Ever Build. However, these products are flammable, irritant and/or toxic and thus just as dangerous to human beings and the environment. In addition, solvent-based products are generally incompatible with painted, varnished, resin-treated, lacquered and/or plasticized floorings, that they degrade when then are used.

Water is also used to clean fresh paint stains. However, its use remains very limited in terms of field of application since it does not make it possible to clean stains made by solvent-based or oil-based paints such as paints referred to as "glycerophthalic", paint known as "Pliolite®" (paint based on heavy petroleum naphtha and on hydrocarbons as solvents) or polyurethane paints. Indeed, the immiscibility of these solvent-based paints with water prevents any efficient cleaning and results in spreading of the stain instead of the cleaning of said stain.

New products termed "eco solvents" or ecological solvents have recently been developed. Mention may in particular be made of the product known as "Ecosolvent" from the company Biotech, the product known as "Ecosolvant" from the company Charbonneaux-Brabant or the product known as "Safer spirit" from the company Ever Build. These eco solvents have the advantage of being biodegradable and not dangerous to the environment. On the other hand, they remain sufficiently aggressive to degrade painted, varnished, resin-treated, lacquered and/or plasticized floorings and cannot be used for high-viscosity solvent-based paints. Furthermore, eco solvents are highly odorous products, the odor of which is uncomfortable for many users.

Thus, at the current time, there is no liquid mixture (preferentially oil-in-water emulsion) for cleaning paint, varnish, dye and/or wood stain spills, which at the same time:
(1) is non-irritant, non-toxic, non-corrosive, non-carcinogenic, non-flammable and not dangerous to its user,
(2) is biodegradable and not dangerous to the environment,
(3) makes it possible to clean stains made by paint, varnish, dye and/or wood-stain of any type,
(4) can be used on any type of flooring without degrading it, including painted, varnished, lacquered, resin-treated and/or plasticized floorings,
(5) does not leave a stain on the flooring after its use, and
(6) does not impair the comfort of the user when it is used, for example by giving off a strong odor that is unpleasant for its user.

Indeed, these six criteria can be contradictory. However, the present inventors have, to their credit, found a liquid mixture (preferentially an oil-in-water emulsion) for cleaning paint, varnish, dye and/or wood stain spills which exhibits an excellent compromise between these various criteria (1)-(6).

SUMMARY OF THE INVENTION

Thus, the invention relates to a liquid mixture for cleaning paint, varnish, dye and/or wood stain spills, comprising:
(a) water,
(b) an organic solvent or a mixture of organic solvents, said organic solvent or said mixture of organic solvents being characterized by the following Hansen solubility parameters:
  $\delta D$ is comprised between 12 and 22, preferentially between 13 and 19,
  $\delta P$ is comprised between 0 and 12, preferentially between 2 and 10, and
  $\delta H$ is comprised between 0 and 16, preferentially between 2 and 9,
(c) a surfactant or a mixture of surfactants, the HLB of said surfactant or of said mixture of surfactants being between 8 and 16,
(d) optionally at least one preservative, and
(e) optionally at least one additive,
characterized in that it is not dangerous to human beings and to the environment, and
that it does not cause degradation of the surfaces on which it is applied.

It also relates to the use of said mixture for cleaning spills of any type of paint, varnish, dye and/or wood stain.

It also relates to a process for cleaning a fresh stain made by paint, varnish, wood stain or dye on a flooring or a support, comprising the following steps:
(1) applying the mixture according to the invention to a fresh stain made by paint, varnish, wood stain and/or dye,
(2) wiping the stain, and
(3) repeating steps (1) and (2) until a clean flooring or support is obtained.

DETAILED DESCRIPTION

Certain definitions of the terms used in the context of the description of the invention are given below.

The term "liquid mixture" is intended to mean a single-phase mixture, or multiphase mixture, such as two-phase or three-phase, a suspension or an emulsion. Preferentially, the mixture according to the invention is an emulsion.

The term "emulsion" is intended to mean a dispersed system consisting of a mixture of at least two liquids that are immiscible with respect to one another, one of which is dispersed in the other in the form of droplets (European Pharmacopeia, eighth edition, volume 1 (2014): 835).

The term "oil-in-water emulsion" is intended to mean an emulsion, the dispersing phase of which is the aqueous phase. These emulsions contain a surfactant or a mixture of surfactants, making it possible to stabilize the system, the HLB of the surfactant or of the mixture of surfactants being between 8 and 16.

The HLB (hydrophilic lipophilic balance) of the surfactant or of the mixture of surfactants will be determined by the Griffin method (Griffin W C: Classification of Surface-Active Agents by 'HLB,' Journal of the Society of Cosmetic Chemists 1 (1949): 311. Griffin W C: Calculation of HLB Values of Non-Ionic Surfactants, Journal of the Society of Cosmetic Chemists 5 (1954): 259).

The emulsions can exhibit signs of phase separation, but are easily redispersed by shaking.

The Hansen solubility parameters are physicochemical characteristics of all types of chemical products which make it possible to evaluate their miscibility with other substances. These parameters were developed by Charles M. Hansen in his thesis (Hansen, Charles: The Three Dimensional Solubility Parameter and Solvent Diffusion Coefficient and Their Importance in Surface Coating Formulation. Copenhagen: Danish Technical Press. (1967)).

The various chemical solvents can be classified by virtue of the Hansen solubility parameters which are respective indicators of:
  the energy of the dispersion forces between molecules: $\delta D$
  the energy of the dipolar force between molecules: $\delta P$, and
  the energy associated with the hydrogen bonds between molecules: $\delta H$.

Thus, the invention relates to a liquid mixture for cleaning paint, varnish, dye and/or wood stain spills, comprising:
  (a) water,
  (b) an organic solvent or a mixture of organic solvents, said organic solvent or said mixture of organic solvents being characterized by the following Hansen solubility parameters:
    $\delta D$ is comprised between 12 and 22, preferentially between 13 and 19,
    $\delta P$ is comprised between 0 and 12, preferentially between 2 and 10, and
    $\delta H$ is comprised between 0 and 16, preferentially between 2 and 9,
  (c) a surfactant or a mixture of surfactants, the HLB of said surfactant or of said mixture of surfactants being comprised between 8 and 16,
  (d) optionally at least one preservative, and
  (e) optionally at least one additive,
characterized in that it is not dangerous to human beings and to the environment, and that it does not cause degradation of the surfaces on which it is applied.

The invention also relates to a liquid mixture for cleaning paint, varnish, dye and/or wood stain spills, comprising:
  (a) water,
  (b) an organic solvent or a mixture of organic solvents,
  (c) a surfactant or a mixture of surfactants, the HLB of said surfactant or of said mixture of surfactants being comprised between 8 and 16, preferably from 10 to 15, and even more preferentially between 11 and 13,
  (d) optionally at least one preservative, and
  (e) optionally at least one additive,
characterized in that it is not dangerous to human beings and to the environment, and
in that it does not cause degradation of the surfaces on which it is applied,
  the organic solvent or the mixture of organic solvents being chosen from the group consisting of ethyl laurate, butyl laurate, ethyl myristate, isopropyl myristate, butyl palmitate, ethyl oleate, and mixtures thereof,
  the water being present in an amount greater than or equal to 70% by weight relative to the total weight of said mixture.

In addition, all the products previously mentioned are not dangerous to human beings and to the environment.

In one preferred embodiment, said mixture defined above is an emulsion.

In one preferred embodiment, said mixture defined above is not a microemulsion.

In one particular embodiment, the emulsion is an oil-in-water emulsion in which the dispersing phase is water and the dispersed phase is the organic solvent.

In one preferred embodiment, said mixture defined above does not comprise a sulfosuccinic acid ester salt.

The advantage of this invention is thus that of providing a liquid mixture (preferentially an emulsion) making it possible to clean any stains made by paint, varnish, dye and/or wood stain regardless of the type of paint, varnish, dye and/or wood stain that has just been spilled and regardless of the flooring or the surface on which the accident took place, this being in a manner that is not dangerous to its user and to the environment.

The term "cleaning" is intended to mean the action of removing the paint, varnish, dye and/or wood stain spill which has not yet totally dried in contact with the air, by mixing it with the mixture (preferentially the emulsion) according to the invention in order to obtain a flooring that is as clean and attractive as the initial flooring before the spill.

Indeed, the composition according to the invention dilutes and detaches from the surface any type of paint, varnish, dye and/or wood stain provided that they have not yet totally dried in contact with the air.

Examples of paint types comprise, but are not limited to, solvent-based paints, water-based paints, acrylic paints, polyurethane paints, polyepoxide paints and glycerophthalic paints.

Examples of wood stain and varnish types comprise, but are not limited to, polyurethane varnishes, acrylic wood stains or glycerophthalic wood stains.

The mixture (preferentially the emulsion) according to the invention is compatible with any type of flooring or surface, that is to say that its use does not cause degradation of the latter.

The term "degradation" is intended to mean a macroscopic modification of the esthetic or physicochemical appearance of the flooring or of the surface to be cleaned, after said flooring or said surface has been brought into contact with the mixture (preferentially the emulsion) according to the invention.

Examples of macroscopic modifications of the esthetic or physicochemical appearance comprise, but are not limited to, flaking, blistering, discoloration, degradation of the integrity of the flooring (swollen, tacky and/or slippery surface), the appearance of at least one stain after drying, the presence of rust and the swelling of the coating by absorption of solvent.

Examples of floorings or surfaces on which the mixture (preferentially the emulsion) is used comprise, but are not limited to, concrete, tiled and resin floorings and painted, varnished, resin-treated, lacquered and/or plasticized floorings.

In addition, the mixture (preferentially the emulsion) according to the invention makes it possible to clean stains made by fresh paint while at the same time respecting the dry and therefore previous paints intentionally applied. In other words, it is possible to use the mixture (preferentially the emulsion) for cleaning spills of fresh paint on painted supports without detrimental modification of the painted supports.

The mixture (preferentially the emulsion) according to the invention is not dangerous to its user and not dangerous to the environment. Thus, the mixture (preferentially the emulsion) according to the invention is in accordance with the REACH European regulation (EC) No. 1907/2006 of Dec. 18, 2006 and does not require labeling with regard to the European CLP regulation (Classification, Labelling and Packaging, Regulation (EC) 1272/2008 of Dec. 16, 2008) in terms of nature and concentration of the components of the mixture (preferentially of the emulsion).

The mixture (preferentially the emulsion) according to the invention is non-irritant, non-toxic, non-corrosive, non-carcinogenic and non-flammable and can be used without risk. The mixture (preferentially the emulsion) according to the invention is not dangerous to the environment and is biodegradable. The use of said mixture (preferentially of said emulsion) according to the invention is thus environmentally friendly. Moreover, even if the mixture (preferentially the emulsion) is discarded, it constitutes biodegradable waste.

The mixture (preferentially the emulsion) according to the invention is not very odorous and thus enables pleasant use.

The qualitative and quantitative composition of the mixture (preferentially of the emulsion) according to the invention is detailed below.

(a) Water

According to one particular embodiment, the water is present in an amount greater than or equal to 70%, preferably from 80% to 99%, and even more preferentially from 85% to 98% by weight relative to the total weight of said mixture (preferentially of said emulsion).

(b) Organic Solvent

According to one particular embodiment, the organic solvent of the mixture (preferentially of the emulsion) is chosen so as to be non-dangerous and is characterized by the following Hansen solubility parameters:

δD is comprised between 12 and 22, preferentially between 13 and 19,

δP is comprised between 0 and 12, preferentially between 2 and 10, and

δH is comprised between 0 and 16, preferentially between 2 and 9.

According to one particular embodiment, the organic solvent is a fatty acid ester constituting the dispersed phase of the emulsion.

According to one particular embodiment, the organic solvent is a $C_5$-$C_{25}$ fatty acid ester of a $C_1$-$C_{10}$ alcohol, preferably a $C_{10}$-$C_{20}$ fatty acid ester of a $C_1$-$C_8$ alcohol and even more preferentially a $C_{12}$-$C_{18}$ fatty acid ester of a $C_1$-$C_5$ alcohol.

According to one particular embodiment, the fatty acid ester is a fatty acid methyl ester, a fatty acid ethyl ester, a fatty acid propyl ester, a fatty acid butyl ester, and mixtures thereof.

It is important for the length of the carbon chain of the fatty acid to be sufficiently high to obtain a non-volatile and non-flammable product.

According to one particular embodiment, the fatty acid ester is chosen from the group consisting of ethyl laurate, butyl laurate, ethyl myristate, isopropyl myristate, butyl palmitate, ethyl oleate, methyl oleate, and mixtures thereof.

The fatty acid ester used is biodegradable and not dangerous to its user and the environment.

According to one particular embodiment, the fatty acid ester is present in an amount of from 0.5% to 30%, preferably from 1% to 20% and even more preferentially from 2% to 15% by weight relative to the total weight of said mixture (preferentially of said emulsion).

(c) Surfactant

The surfactant(s) make(s) it possible to stabilize the mixture (preferentially the emulsion).

In order to obtain a mixture (preferentially an oil-in-water emulsion) that is stable, with the chosen dispersed phase, the HLB of the surfactant or of the mixture of surfactants must be comprised between 8 and 16, preferably from 10 to 15, and even more preferentially between 11 and 13. Such HLB values make it possible to improve the stability of the mixture (preferentially of the emulsion).

By way of example, the surfactant(s) is (are) chosen from nonionic surfactants such as sorbitan polyoxyethylenes, fatty acid esters of sorbitan, alkylpolyglucosides, alkylpolypentosides, polyethylene glycol esters of fatty acids, poloxamers, and also ionic and nonionic phospholipids, and mixtures thereof. By way of example of surfactants, mention may be made of polysorbates (Tween®, Montanox®), sorbitan esters (Span®, Montane®, sorbitan laurate), fatty acids, castor oils or fatty alcohols that are ethoxylated (Simulsol® products), alkylpolypentosides (Appyclean®), polyoxylated castor oils (Kolliphor®), or phospholipids (Lipoid®).

Advantageously, the surfactant(s) used is (are) biodegradable and not dangerous to its user and the environment.

According to one particular embodiment, the surfactant(s) is (are) chosen from sorbitan polyoxyethylenes, fatty acid esters of sorbitan, alkylpolyglucosides, polyethylene glycol esters of fatty acids, and mixtures thereof.

According to one preferred embodiment, the polysorbate 80—sorbitan laurate mixture is used as surfactant with a weight ratio of 3:2 in order to obtain an HLB of 12.44.

According to one preferred embodiment, the polysorbate 80—sorbitan laurate mixture is used as surfactant with a weight ratio of 6.9:3.1 in order to obtain an HLB of 13.

According to one preferred embodiment, the polysorbate 85-Cremophor® RH 40 (PEG-40 hydrogenated castor oil) mixture is used as surfactant with a weight ratio of 1:1 in order to obtain an HLB of 13.

According to one particular embodiment, the surfactant(s) is (are) present in an amount of from 0.1% to 25%, preferably from 0.5% to 15% and even more preferentially from 1% to 10% by weight relative to the total weight of said mixture (preferentially of said emulsion).

(d) Preservatives

According to one particular embodiment, the mixture (preferentially the emulsion) of the present invention may contain at least one preservative.

The preservatives according to the present invention make it possible to limit the development of microorganisms within the mixture (preferentially the emulsion). More particularly, they make it possible to stop or inhibit the growth of microorganisms. The concentrations used are bacteriostatic. The combination of an antibacterial (ATB) with an antifungal (ATF) may be required. Thus, the addition of at least one preservative makes it possible to obtain a mixture (preferentially an emulsion) which does not allow the growth and multiplication of bacteria, of fungi and/or of molds.

The preservatives are those conventionally used, in particular, of alcohol, acid, acid salt, acid ester or essential oil type.

According to one particular embodiment, the preservative is chosen from alcohols: benzyl alcohol (ATB, 2%), ethanol (ATB, ≥10%); phenols: cresol (ATB, 2% to 3%); acids and salts thereof: benzoic acid, sorbic acid (ATF, ≤5%); para-hydroxybenzoic acid esters: methyl ester (ATB, 0.2%), ethyl ester (ATB, 0.2%), propyl ester (ATF, 0.05%), butyl ester (ATF, 0.05%), and mixtures thereof.

For the purposes of the present invention, the term "ATB" or "ATF" is intended to mean the threshold concentration in the mixture (preferentially the emulsion) starting from which the preservative has an actual antibacterial (ATB) or antifungal (ATF) action.

According to one particular embodiment, the preservative is chosen from the group consisting of sorbic acid and salts thereof, salicylic acid and salts thereof, dehydroacetic acid and salts thereof, essential oils, and mixtures thereof.

According to one particular embodiment, the preservative is present in an amount of from 0% to 2%, preferably from 0.01% to 1% and even more preferentially from 0.05% to 0.5% by weight relative to the total weight of said mixture (preferentially of said emulsion).

(e) Additives

According to one particular embodiment, the mixture (preferentially the emulsion) may also contain at least one additive chosen from dyes, fragrances, stabilizers, antioxidants, and mixtures thereof.

Dyes

By way of example of a dye, mention may be made of any dye devoid of toxicity when it is incorporated into a solution or into an emulsion, for example of food quality. In particular, mention may be made of anthraquinone dyes (anthraquinone derivatives), indigoid dyes (indigo derivatives), chlorophyll, patent blue V, carmoisine, tartrazine, trapaeolin, bromocresol purple, bromophenol blue, congo red, neutral red, phenolphthalein, alizarine yellow, cresol red, indigo carmine, etc.

Fragrances

The fragrances may be of natural origin, such as essential oils of flowers or of fruits, wood bark (cinnamon, sandalwood), resin (incense, myrrh), etc. Use may also be made of synthetic fragrances, such as vanillin.

Stabilizers

By way of example of a stabilizer, mention may be made of dispersing-phase thickeners, solid particles, and ionic surfactants. These products make it possible in particular to limit aggregation phenomena in the mixtures and the emulsions, to improve electrostatic or steric repulsion between the dispersing phase and the dispersed phase, and thus to increase the stability of the system.

By way of example, mention may be made of, as aqueous dispersing-phase thickeners: cellulose-based derivatives, carbomers, gums (guar, xanthan), polysaccharides (carrageenan, agar, arabic); as stabilizing solid particles: magnesium and aluminum silicates, colloidal clays; as ionic surfactants: alkyl sulfates, alkali metal salts.

Antioxidants

The antioxidants make it possible to protect the mixture (preferentially the emulsion) against oxidizing degradation due to the presence of free radicals.

By way of example of antioxidants, mention may be made of citric acid and salts thereof, tartaric acid and salts thereof, ascorbic acid, α-tocopherol, or ethylediaminetetraacetic acid.

The mixture (preferentially the emulsion) according to the invention comprises a very low volatile organic compound (VOC) content, in particular less than or equal to 10 g/l.

According to one preferred embodiment, the mixture (preferentially the emulsion) is free of volatile organic compounds (VOC).

According to one particular embodiment, the mixture (preferentially the emulsion) according to the invention comprises:
- 90% to 98%, preferably 93% to 96% of water by weight relative to the total weight of said mixture (preferentially of said emulsion),
- 2% to 10%, preferably 3% to 5% of fatty acid ester by weight relative to the total weight of said mixture (preferentially of said emulsion),
- 0.5% to 3%, preferably 1% to 2% of surfactant(s) by weight relative to the total weight of said mixture (preferentially of said emulsion), and
- 0.01% to 1%, preferably 0.05% to 0.5% of preservative(s) by weight relative to the total weight of said mixture (preferentially of said emulsion).

The mixture (preferentially the emulsion) defined above comprises:
- as surfactant, sorbitan laurate in a proportion of from 0.1% to 10%, preferably from 0.3% to 5% by weight relative to the total weight of said mixture (preferentially of said emulsion),
- as surfactant, polysorbate 80 in a proportion of from 0.1% to 10%, preferably from 0.3% to 5% by weight relative to the total weight of said mixture (preferentially of said emulsion),
- as preservative, sorbic acid in a proportion of from 0.01% to 2%, preferably 0.01% to 1% by weight relative to the total weight of said mixture (preferentially of said emulsion), and
- as preservative, potassium sorbate in a proportion of from 0.01% to 2%, preferably 0.01% to 1% by weight relative to the total weight of said mixture (preferentially of said emulsion).

According to one particular embodiment, the mixture (preferentially the emulsion) according to the invention comprises:
- 80% to 98%, preferably 85% to 93% of water by weight relative to the total weight of said mixture (preferentially of said emulsion),
- 2% to 10%, preferably 3% to 8% of fatty acid ester by weight relative to the total weight of said mixture (preferentially of said emulsion),
- 0.5% to 5%, preferably 1% to 3% of surfactant(s) by weight relative to the total weight of said mixture (preferentially of said emulsion), and
- 0.01% to 2%, preferably 0.05% to 0.5% of preservative(s) by weight relative to the total weight of said mixture (preferentially of said emulsion).

The mixture (preferentially the emulsion) previously defined comprises:
- as surfactant, polysorbate 80 in a proportion of from 0.1% to 10%, preferably from 0.5% to 5% by weight relative to the total weight of said mixture (preferentially of said emulsion), as surfactant, sorbitan laurate in a proportion of from 0.1% to 10%, preferably from 0.3% to 5% by weight relative to the total weight of said mixture (preferentially of said emulsion), as preservative, sorbic acid in a proportion of from 0.01% to 2%, preferably 0.01% to 1% by weight relative to the total weight of said mixture (preferentially of said emulsion), and as preservative, potassium sorbate in a proportion of from 0.01% to 2%, preferably 0.01% to 1% by weight relative to the total weight of said mixture (preferentially of said emulsion).

According to one particular embodiment, the mixture (preferentially the emulsion) according to the invention comprises:

80% to 98%, preferably 83% to 90% of water by weight relative to the total weight of said mixture (preferentially of said emulsion), 2% to 10%, preferably 3% to 8% of fatty acid ester by weight relative to the total weight of said mixture (preferentially of said emulsion), 0.5% to 15%, preferably 3% to 12% of surfactant(s) by weight relative to the total weight of said mixture (preferentially of said emulsion), and 0.01% to 1%, preferably 0.05% to 0.5% of preservative(s) by weight relative to the total weight of said mixture (preferentially of said emulsion).

The mixture (preferentially the emulsion) according to the invention makes it possible to eliminate paint, varnish, dye and/or wood stain spills on any type of surface. Indeed, the mixture (preferentially the emulsion) is compatible with any type of flooring or surfaces. The term "compatible" is intended to mean that it does not cause degradation of the floorings or surfaces on which it is applied.

The mixture (preferentially the emulsion) according to the invention is physically stable, that is to say that, after 10 days of storage at 25° C., no phase separation is observed and/or the droplets of the mixture (preferentially of the emulsion) are not enlarged. The stability of the mixture (preferentially of the emulsion) can be verified using a device which measures the turbidity of the mixture (preferentially of the emulsion): the Turbiscan Lab manufactured by the company Formulaction, under the conditions described below in the section "Measurement of the stability of the emulsion".

Thus, in one particular embodiment, the mixture (preferentially the emulsion) according to the invention is characterized in that it is stable over time such that, after 10 days of storage at 25° C.:

the TSI (turbiscan stability index) on the lower portion is less than 10, the TSI on the central portion is less than 5, and the TSI on the upper portion is less than 10.

The invention also relates to the use of the mixture (preferentially of the emulsion) according to the present invention, for cleaning paint, varnish, dye and/or wood stain spills.

Thus, all the embodiments linked to the mixture (preferentially to the emulsion) according to the invention are also applicable to the use of the mixture (preferentially of said emulsion).

Cleaning Process

The present invention also relates to a process for cleaning a fresh stain made by paint, varnish, wood stain and/or dye on a flooring or a support, comprising the following steps:

(1) applying the mixture (preferentially the emulsion) according to the invention to a fresh stain made by paint, varnish, wood stain and/or dye, (2) wiping the stain, and (3) repeating steps (1) and (2) until a clean flooring or support is obtained.

According to one particular embodiment, the cleaning process comprises a prior step of eliminating the freshly spilled paint, varnish, wood stain or dye by absorption and/or wiping.

Thus, just after the spill, the surplus of freshly spilled product (paint, varnish, wood stain or dye) is removed by absorption and/or wiping. A fresh stain then remains on the support. The process above is then applied.

Advantageously, the flooring or the support as defined above is a washable flooring or support.

The invention will now be illustrated by the following nonlimiting examples.

EXAMPLES

In the examples which follow, the following commercial products are used:
Cleaning Products:
Dearomatized white spirit sold by Onyx
Solvapeint sold by Onyx
Paint cleaner substitute sold by Onyx
Safer Spirit cleaner sold by Ever Build.
Surfactants:
Polysorbate 80 sold under the brand name Montanox 80 VG DF by SEPPIC
Polysorbate 85 sold under the brand name Montanox 85 VG DF by SEPPIC
Cremophor® RH 40 sold by BASF
Sorbitan laurate sold under the brand name Montane 20 by SEPPIC.
Fatty Acid Ester:
Ethyl oleate sold by Sigma-Aldrich
Ethyl myristate sold by Sigma-Aldrich.
Preservatives:
Potassium sorbate sold by Sigma Aldrich
Sorbic acid sold by Sigma Aldrich.
Absorbent:
Polyvalent Polycaptor® absorbent sold by Prévor.
Paints:
Climats Extremes® V33 Polysiloxane wood paint
Tollens interior scene acrylic paint
Dulux Valentine valenite glycerophthalic lacquer
Hammerite® antirust paint
Luxens acrylic resin tiling & stratified PVC, ALU, GALVA undercoat
Syntilor satin BSC polyurethane varnish
Inventiv' HydroPliolite® universal façade paint
Castorama all-paint universal dye
Mr.Bricolage interior—exterior satin wood stain
Test Protocols
Measurement of the Stability of the Emulsion:

The stability of the emulsion is verified using a device which measures the turbidity of the emulsion: the Turbiscan Lab manufactured by the company Formulaction. Thus, the indices of transmission and of backscattering of the light through a tube containing the emulsion are measured. These measurements are carried out over a period of 10 days at 25° C.

During the emulsion aging phase, two phenomena can appear.

1. Increase in Droplet Size

The emulsion according to the invention consists of droplets of oil dispersed in an aqueous phase.

If the emulsion is not sufficiently stable, the droplets agglomerate with one another. The Ostwald ripening phenomenon, during which the molecules contained in the globules migrate to another droplet making it increase in size, may also be observed.

The increase in droplet size is the first step of destabilization of the emulsion. This is an irreversible step. This phenomenon is characterized by modification of the backscattering index over the whole of the sample containing the emulsion.

2. Phase Separation by Sedimentation or Creaming

The emulsion may also become destabilized if some droplets migrate by gravity to the bottom of the sample (sedimentation phenomenon) or to the top of the sample (creaming phenomenon). This phase separation may be partial or total. This is a reversible phenomenon. Indeed, to reform the original emulsion, it is sufficient to perform simple stirring.

This phenomenon is characterized by a modification of the transmission and backscattering indices on the upper and lower portions of the sample, without influencing the central portion of the sample.

For the purposes of the present invention, a creaming phenomenon is observed when the backscattering index increases on the upper portion of the sample and decreases on the lower portion.

The progression of the two phenomena mentioned above, and thus the stability of the emulsion, is estimated by virtue of two indicators measured over a period of 10 days:

The TSI (Turbiscan Stability Index) calculated on the central portion of the sample (between 40% and 60% of the total height of the sample), makes it possible to evaluate the enlargement of the droplets.

If, during the 10-day period, the TSI index exceeds the value 5 on the central portion of the sample, then the droplet enlargement phenomenon is judged to be too great and the emulsion is considered to be unstable.

The TSIs calculated on the upper portion (between 80% and 100% of the total height of the sample) and the lower portion (between 0% and 20% of the total height of the sample) of the sample make it possible to evaluate the phase separation of the emulsion. If, during the 10-day period, one of the two TSI indices exceeds the value 10 on the upper or lower portions of the sample, then the phase separation phenomenon is judged to be too great and the emulsion is considered to be unstable.

Measurement of the Efficiency of the Cleaning of Paints of Any Type:

The efficiency of the emulsion is verified using a cleaning protocol applied for the following paint, wood stain, varnish and dye categories:

aqueous paints: acrylic pain, acrylic undercoat, and universal dye;

solvent-based paints: HydroPliolite® paint, glycerophthalic paint, siloxane paint, and antirust paint; and wood stain and varnish: polyurethane varnish, and wood stain.

Cleaning Protocol:

1. addition of 10 mL of paint to a test surface frequently present in DIY superstores, which is tiling,
2. absorption of the liquid using a powdered absorbent, which is the Polycaptor® polyvalent absorbent,
3. collection of the absorbent so as to leave only a fresh paint stain,
4. addition of 10 mL of composition according to the invention to the stain formed, and
5. cleaning of the stain using a paper towel product.

The emulsion tested is "judged efficient" if the fresh paint can be easily removed and if the surface after cleaning is esthetically as clean as before the accident. The color due to the paint stain must have completely disappeared. The assessment is carried out visually. A photograph is taken at the end of steps 1, 3 and 5.

Evaluation of the Compatibility with the Various Surfaces:

The compatibility of the emulsion tested with various surfaces is evaluated by bringing 10 mL of the emulsion tested into contact on said surface. After a leave-on time of 15 min, the liquid product is removed by absorption then the condition of the surface is evaluated visually and mechanically in order to determine any degradation. If said surface exhibits one of the following characteristics:

flaking of the surface blistering discoloration of the flooring degradation of the integrity of the flooring (swollen, tacky, slippery, etc., surface)

appearance of a stain presence of rust then the emulsion tested is considered to be incompatible with said surface.

Evaluation of the Antimicrobial and Antifungal Activity:

The antimicrobial and antifungal activity of the emulsion tested is determined by means of a challenge test according to the cosmetic standard NF EN ISO 21149 and NF EN ISO 11930. The antimicrobial and antifungal activity is determined on the following test strains:

*P. aeruginosa*

*S. aureus*

*E. coli*

*C. albicans*

*A. brasiliensis*

row 1: photos taken at the end of step 1 row 2: photos taken at the end of step 3 and row 3: photos taken at the end of step 5.

FIG. 2 is a comparative table grouping together the photographs taken for evaluating the compatibility between water, white spirit, solvapeint, paint cleaning substitute, safer spirit and emulsions 1, emulsions 2 and emulsions 3 of the invention on various floorings and painted surfaces.

Figure 3:

FIG. 3 is a comparative table grouping together the photographs taken for evaluating the efficiency of the cleaning of the paints for emulsion No. 2:

row 1: photos taken at the end of step 1 row 2: photos taken at the end of step 3 and row 3: photos taken at the end of step 5.

Figure 4:
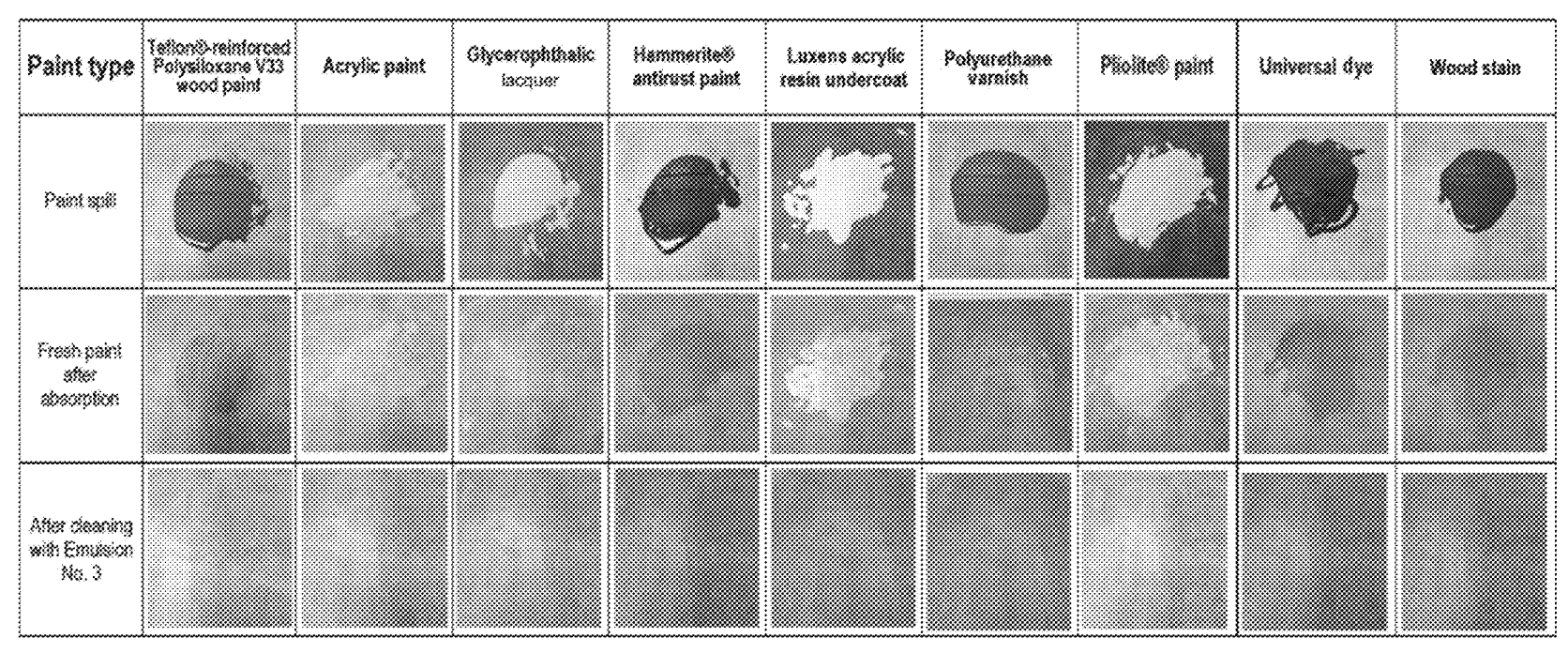

FIG. 4 is a comparative table grouping together the photographs taken for evaluating the efficiency of the cleaning of the paints for emulsion No. 3:

row 1: photos taken at the end of step 1 row 2: photos taken at the end of step 3 and row 3: photos taken at the end of step 5.

EXAMPLE 1

Emulsion No. 1

An emulsion is prepared by mixing 5 g of sorbitan laurate, 7.5 g of Polysorbate 80, 37.5 g of ethyl oleate, 0.5 g of sorbic acid, 0.5 g of potassium sorbate and 949 g of water.

Emulsion No. 1 has the following properties:

Stability Test:

The emulsion is physically stable in the light of the TSI indicators measured after storage for 10 days at 25° C.

Figure 1:
FIG. 1 is a comparative table grouping together the photographs taken for evaluating the efficiency of the cleaning of the paints for emulsion No. 1.

The following were in fact obtained:
TSI central portion: 0.96
TSI lower portion: 6.1
TSI upper portion: 6.3
Cleaning Efficiency Test
Regardless of the type of paint, varnish, dye or wood stain spilled, emulsion No. 1 made it possible to clean the stain and to return to the initial flooring (see FIG. 1).
Test for Evaluating Compatibility with Various Floorings and Painted Surfaces
Regardless of the coating on which emulsion No. 1 was tested, no degradation was observed (see FIG. 2).
On the other hand, all the other tested cleaning products of the prior art (white spirit, solvapeint, Onyx paint cleaning substitute, Safer Spirit cleaner), except water, brought about degradation of certain coatings.
Evaluation of the Antimicrobial and Antifungal Activity:
Emulsion No. 1 is a medium which does not allow the growth and multiplication of microorganisms. The challenge test carried out with emulsion No. 1 according to standard NF EN ISO 21149 and standard NF EN ISO 11930 gives satisfactory results after incubation for 28 days, regardless of the strain tested.

EXAMPLE 2

Composition 2

An emulsion is prepared by mixing 17.2 g of Polysorbate 80, 7.8 g of sorbitan laurate, 75 g of ethyl oleate, 0.5 g of sorbic acid, 0.5 g of potassium sorbate and 899 g of water.
Emulsion No. 2 has the following properties:
Stability Test:
The emulsion is physically stable in the light of the TSI indicators measured after storage for 10 days at 25° C.
The following were in fact obtained:
TSI central portion: 1.1
TSI lower portion: 6.1
TSI upper portion: 3.6
Cleaning Efficiency Test:
Regardless of the type of paint, varnish, dye or wood stain spilled, emulsion No. 2 made it possible to clean the stain and to return to the initial flooring (see FIG. 3).
Test For Evaluating Compatibility with Various Floorings and Painted Surfaces
Regardless of the coating on which emulsion No. 2 was tested, no degradation was observed (see FIG. 2).

EXAMPLE 3

Emulsion No. 3

An emulsion is prepared by mixing 50 g of Polysorbate 85, 50 g of Cremophor® RH 40, 56 g of ethyl myristate, 0.5 g of sorbic acid, 0.5 g of potassium sorbate and 899 g of water.
Emulsion No. 3 has the following properties:
Stability Test:
The emulsion is physically stable in the light of the TSI indicators measured after storage for 10 days at 25° C.
The following were in fact obtained:
TSI central portion: 2
TSI lower portion: 1.8
TSI upper portion: 4.5

Cleaning Efficiency Test:
Regardless of the type of paint, varnish, dye or wood stain spilled, emulsion No. 3 made it possible to clean the stain and to return to the initial flooring (see FIG. 4).
Test for Evaluating Compatibility with Various Floorings and Painted Surfaces:
Regardless of the coating on which emulsion No. 3 was tested, no degradation was observed (see FIG. 2).

CONCLUSIONS

It should be noted that, regardless of the nature of the products used and the concentrations thereof, the emulsion according to the present invention showed a better cleaning efficiency in comparison with other products that are currently commercially available.
Furthermore, the emulsion of the present invention is stable.
In addition, the emulsion of the present invention is compatible with all the floorings and painted surfaces tested.

The invention claimed is:
1. A liquid mixture for cleaning any type of paint, varnish, dye and/or wood stain spills, comprising:
   (a) water in an amount of at least 70% by weight relative to a total weight of said mixture,
   (b) an organic solvent or a mixture of organic solvents selected from the group consisting of ethyl laurate, butyl laurate, ethyl myristate, butyl palmitate, ethyl oleate, and mixtures thereof, said organic solvent or said mixture of organic solvents having the following Hansen solubility parameters:
   $\delta D$ is comprised between 12 and 22,
   $\delta P$ is comprised between 0 and 12, and
   $\delta H$ is comprised between 0 and 16,
   (c) a surfactant or a mixture of surfactants chosen from sorbitan polyoxyethylenes, fatty acid esters of sorbitan, polyethoxylated castor oils and mixtures thereof, the HLB of said surfactant or of said mixture of surfactants being comprised between 8 and 16,
   (d) a preservative selected from the group consisting of sorbic acid and salts thereof, salicylic acid and salts thereof, dehydroacetic acid and salts thereof, essential oils, and mixtures thereof,
   wherein the mixture is not dangerous to human beings and to the environment,
   wherein the mixture does not cause degradation of the surfaces on which the liquid mixture is applied, and
   wherein the mixture is not a microemulsion.
2. The mixture as claimed in claim 1, wherein the mixture is an emulsion.
3. The mixture as claimed in claim 1, wherein said mixture does not comprise a sulfosuccinic acid ester salt.
4. The mixture as claimed in claim 1, wherein the mixture is an oil-in-water emulsion in which the dispersing phase is water and the dispersed phase is the organic solvent.
5. The mixture as claimed in claim 1, wherein the organic solvent or the mixture of organic solvents is present in an amount of from 0.5% to 30% by weight relative to the total weight of said mixture.
6. The mixture as claimed in claim 1, wherein the surfactant is chosen from polysorbate 80, polysorbate 85, sorbitan laurate, Cremophor® RH 40 and mixtures thereof.
7. The mixture as claimed in claim 1, wherein the surfactant is present in an amount of from 0.1% to 25% by weight relative to the total weight of said mixture.

8. The mixture as claimed in claim 1, wherein the preservative is present in an amount of from 0.01% to 2% by weight relative to the total weight of said mixture.

9. The mixture as claimed in claim 1, wherein said mixture is free of volatile organic compounds (VOC).

10. A process for cleaning a fresh stain made by paint, varnish, wood stain or dye on a flooring or a support, comprising the following steps:
 (1) applying the mixture as defined in claim 1 to a fresh stain made by paint, varnish, wood stain and/or dye,
 (2) wiping the stain, and
 (3) repeating steps (1) and (2) until a clean flooring or support is obtained.

11. The cleaning process as claimed in claim 10, which comprises a prior step of removing freshly spilled paint, varnish, wood stain or dye by absorption and/or wiping.

12. The liquid mixture of claim 1, wherein the HLB of said surfactant or of said mixture of surfactants being comprised between 10 and 15.

13. The liquid mixture of claim 1, wherein the HLB of said surfactant or of said mixture of surfactants being comprised between 11 and 13,
 $\delta D$ is comprised between 13 and 19,
 $\delta P$ is comprised between 2 and 10, and
 $\delta H$ is comprised between 2 and 9.

14. The liquid mixture of claim 12, further comprising at least one additive selected from the group consisting of dyes, fragrances, stabilizers, antioxidants, and mixtures thereof.

15. The mixture as claimed in claim 2, wherein the mixture is an oil-in-water emulsion in which the dispersing phase is water and the dispersed phase is the organic solvent.

16. The mixture as claimed in claim 3, wherein the mixture is an oil-in-water emulsion in which the dispersing phase is water and the dispersed phase is the organic solvent.

17. The liquid mixture of claim 1, further comprising at least one additive selected from the group consisting of dyes, fragrances, stabilizers, antioxidants, and mixtures thereof.

* * * * *